(12) United States Patent
Ma et al.

(10) Patent No.: US 12,645,453 B2
(45) Date of Patent: *Jun. 2, 2026

(54) DATA TRANSFER FOR VECTORS IN NEURAL NETWORKS

(71) Applicant: Anhui Cambricon Information Technology Co., Ltd., Hefei (CN)

(72) Inventors: Xuyan Ma, Hefei (CN); Jianhua Wu, Hefei (CN); Shaoli Liu, Hefei (CN); Xiangxuan Ge, Hefei (CN); Hanbo Liu, Hefei (CN); Lei Zhang, Hefei (CN)

(73) Assignee: ANHUI CAMBRICON INFORMATION TECHNOLOGY CO., LTD., Hefei (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/620,516

(22) PCT Filed: Apr. 28, 2021

(86) PCT No.: PCT/CN2021/090675
§ 371 (c)(1),
(2) Date: Sep. 30, 2022

(87) PCT Pub. No.: WO2021/223644
PCT Pub. Date: Nov. 11, 2021

(65) Prior Publication Data
US 2023/0068827 A1 Mar. 2, 2023

(30) Foreign Application Priority Data

May 8, 2020 (CN) .......................... 202010390227.7

(51) Int. Cl.
*G06F 9/30* (2018.01)
*G06F 9/345* (2018.01)
(Continued)

(52) U.S. Cl.
CPC ........ *G06F 9/30036* (2013.01); *G06F 9/3455* (2013.01); *G06F 9/355* (2013.01); *G06F 15/8053* (2013.01)

(58) Field of Classification Search
CPC ............. G06F 9/30036; G06F 9/30038; G06F 9/3004; G06F 9/30043; G06F 9/34;
(Continued)

(56) References Cited

U.S. PATENT DOCUMENTS 10,887,252 B2 * 1/2021 Bohrer .................. H04L 49/901
2012/0254591 A1 * 10/2012 Hughes ................. G06F 9/3013
712/205

(Continued)

FOREIGN PATENT DOCUMENTS

CN 103810125 A 5/2014
CN 104756068 A 7/2015
(Continued)

OTHER PUBLICATIONS

PCT/CN2021/090675—International Search Report and Written Opinion, mailed Jul. 28, 2021, 10 pages. (with English translation).
EP21800387.9—Extended European Search Report mailed on Jan. 29, 2024, 10 pages.
CN202010390227.7—First Office Action mailed on Nov. 30, 2024, 18 pages.

*Primary Examiner* — Andrew Caldwell
*Assistant Examiner* — Kasim Alli
(74) *Attorney, Agent, or Firm* — Getech Law LLC; Jun Ye

(57) ABSTRACT

The present disclosure relates to a data processing method and device, and related products. The product may include a control unit. The control unit may include an instruction caching unit, an instruction processing unit, and a storage queue unit. The instruction caching unit is configured to store a calculation instruction associated with an artificial (Continued)

neural network computation. The instruction processing unit may be configured to parse the calculation instruction to obtain a plurality of computation instructions. The storage queue unit may be configured to store an instruction queue, where the instruction queue may include a plurality of computation instructions or calculation instructions to be executed in a sequence of the queue. By adopting the above method, the present disclosure may improve a computation efficiency of the related products when performing a neural network model computation.

11 Claims, 5 Drawing Sheets

(51) Int. Cl.
    *G06F 9/355*       (2018.01)
    *G06F 15/80*       (2006.01)
(58) Field of Classification Search
    CPC .......... G06F 9/345; G06F 9/3455; G06F 9/35;
                        G06F 9/355; G06F 15/8053; G06F
                        9/30145; G06F 9/3016
    See application file for complete search history.

(56)                    References Cited

U.S. PATENT DOCUMENTS

| | | | |
|---|---|---|---|
| 2014/0136811 A1* | 5/2014 | Fleischer | G06F 9/3887 |
| | | | 711/207 |
| 2014/0195778 A1* | 7/2014 | Ould-Ahmed-Vall | ...................... |
| | | | G06F 9/3016 |
| | | | 712/22 |
| 2017/0031865 A1 | 2/2017 | Eyole et al. | |
| 2017/0177364 A1* | 6/2017 | Ould-Ahmed-Vall | ...................... |
| | | | G06F 9/3455 |
| 2017/0192781 A1* | 7/2017 | Valentine | G06F 9/30043 |
| 2017/0192782 A1* | 7/2017 | Valentine | G06F 9/30109 |
| 2017/0242626 A1 | 8/2017 | O'Krafka et al. | |
| 2017/0255470 A1* | 9/2017 | Forsyth | G06F 9/30105 |
| 2019/0042245 A1* | 2/2019 | Toll | G06F 9/30036 |
| 2019/0250914 A1* | 8/2019 | Grocutt | G06F 9/30036 |
| 2021/0096858 A1* | 4/2021 | King | G06F 13/1668 |

FOREIGN PATENT DOCUMENTS

| | | |
|---|---|---|
| CN | 107807819 A | 3/2018 |
| CN | 107851014 A | 3/2018 |

* cited by examiner

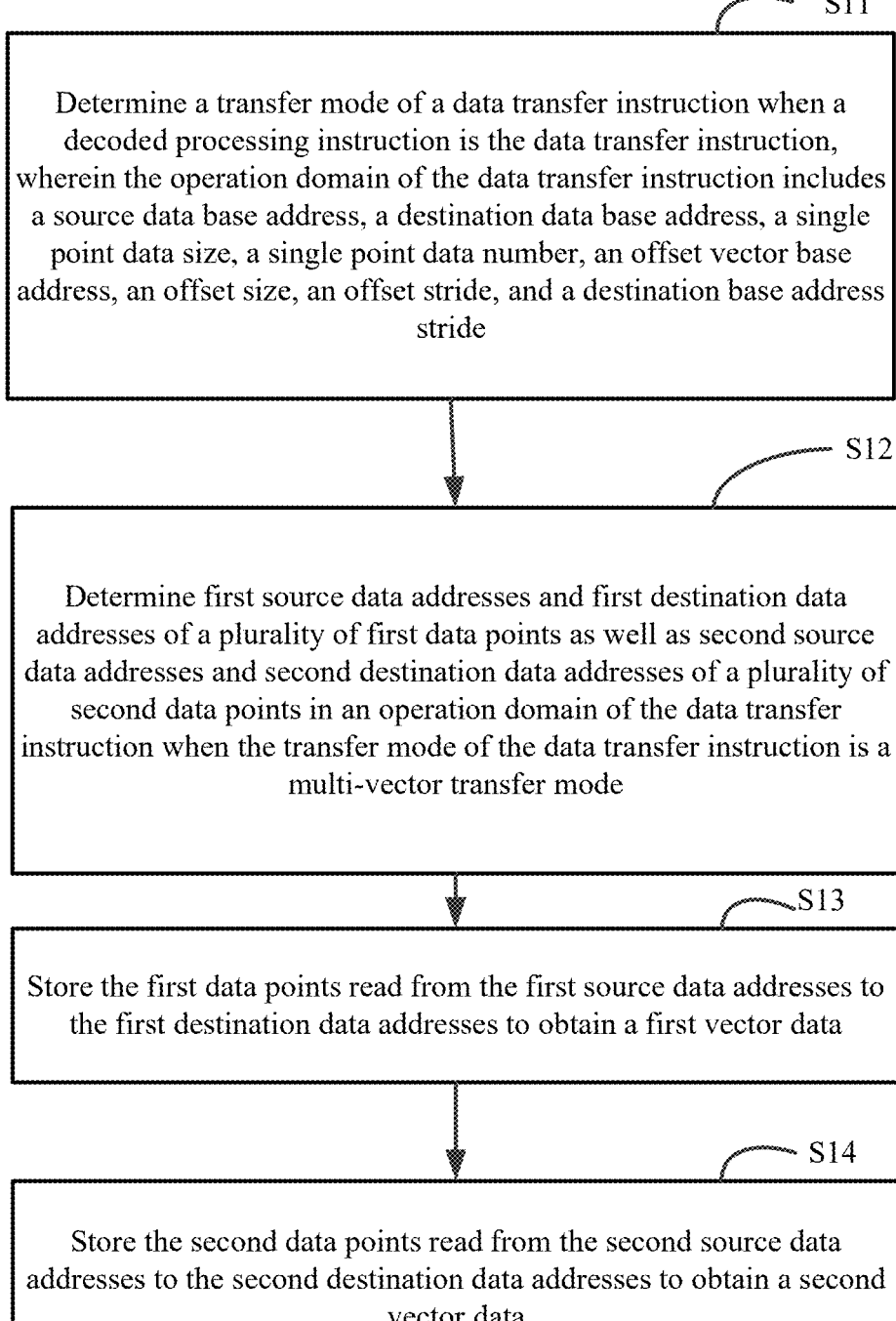

Determine a transfer mode of a data transfer instruction when a decoded processing instruction is the data transfer instruction, wherein the operation domain of the data transfer instruction includes a source data base address, a destination data base address, a single point data size, a single point data number, an offset vector base address, an offset size, an offset stride, and a destination base address stride Determine first source data addresses and first destination data addresses of a plurality of first data points as well as second source data addresses and second destination data addresses of a plurality of second data points in an operation domain of the data transfer instruction when the transfer mode of the data transfer instruction is a multi-vector transfer mode Store the first data points read from the first source data addresses to the first destination data addresses to obtain a first vector data Store the second data points read from the second source data addresses to the second destination data addresses to obtain a second vector data

Fig. 2

DATA TRANSFER FOR VECTORS IN NEURAL NETWORKS

CROSS REFERENCE OF RELATED APPLICATION

This is a 371 of International Application No. PCT/CN2021/090675, filed Apr. 28, 2021 which claims priority to Chinese Patent Application No. 202010390227.7, filed on May 8, 2020, and entitled "DATA PROCESSING METHOD AND DEVICE, AND RELATED PRODUCT"., the entire content of which is incorporated herein by reference. The content of the aforementioned applications are herein incorporated by reference in their entirety.

TECHNICAL FIELD

The present disclosure relates to the field of computer technology, and particularly to a data processing method and device, and related products.

BACKGROUND

With the development of the artificial intelligence technology, the artificial intelligence technology has made great progress in image recognition and other fields. During image recognition, a large number of discrete data points may need to be processed (such as performing a difference computation). However, a process of processing discrete data points by means of related technologies is relatively complicated, resulting in relatively high data overhead.

SUMMARY

In view of this, it is necessary to provide a data processing method and apparatus, and related products to solve the above technical problems.

A first aspect of the present disclosure provides a data processing method. The data processing method may include: determining a transfer mode of a data transfer instruction when a decoded processing instruction is the data transfer instruction; determining first source data addresses and first destination data addresses of a plurality of first data points as well as second source data addresses and second destination data addresses of a plurality of second data points in an operation domain of the data transfer instruction when the transfer mode of the data transfer instruction is a multi-vector transfer mode; storing the first data points read from the first source data addresses to the first destination data addresses to obtain first vector data; and storing the second data points read from the second source data addresses to the second destination data addresses to obtain second vector data, where the first source data addresses and the second source data addresses may include a plurality of discrete data addresses, and the first destination data addresses and the second destination data addresses may include consecutive data addresses.

A second aspect of the present disclosure provides a data processing apparatus. The data processing apparatus may include a mode determining unit, an address determining unit, a first storage unit, and a second storage unit. The mode determining unit may be configured to determine a transfer mode of a data transfer instruction when a decoded processing instruction is the data transfer instruction. The address determining unit may be configured to determine the first source data addresses and the first destination data addresses of a plurality of first data points as well as second source data addresses and second destination data addresses of a plurality of second data points in an operation domain of the data transfer instruction when the transfer mode of the data transfer instruction is a multi-vector transfer mode. The first storage unit may be configured to obtain first vector data by storing the first data points read from the first source data addresses to the first destination data addresses. The second storage unit may be configured to obtain second vector data by storing the second data points read from the second source data addresses to the second destination data addresses, where the first source data addresses and the second source data addresses may include a plurality of discrete data addresses, and the first destination data addresses and the second destination data addresses may include consecutive data addresses.

A third aspect of the present disclosure provides an artificial intelligence chip. The artificial intelligence chip may include the above data processing apparatus.

A fourth aspect of the present disclosure provides an electronic device. The electronic device may include the above artificial intelligence chip.

A fifth aspect of the present disclosure provides a board card. The board card may include a storage component, an interface apparatus, a control component, and the above artificial intelligence chip. The artificial intelligence chip is connected with the storage component, the control component, and the interface apparatus. The storage component may be configured to store data. The interface apparatus may be configured to implement data transmission between the artificial intelligence chip and an external device. The control component may be configured to monitor a state of the artificial intelligence chip.

According to embodiments of the present disclosure, a plurality of pieces of vector data may be obtained by transferring discrete data respectively to a plurality of consecutive data addresses via one data transfer instruction. As such, vector computation and other processing may be implemented, which may simplify a processing process, thereby reducing data overhead.

By deriving technical features of claims, advantageous effects corresponding to the technical problems in the BACKGROUND may be achieved. Exemplary embodiments will be described in detail with reference to accompanying drawings, and other features and aspects of the present disclosure will become clear.

BRIEF DESCRIPTION OF THE DRAWINGS

Accompanying drawings contained in the specification and constituting a part of the specification together with the specification illustrate exemplary embodiments, features, and aspects of the present disclosure, and are used to explain the principle of the present disclosure.

FIG. 2 is a flowchart of a data processing method, according to an embodiment of the present disclosure.

DETAILED DESCRIPTION

Figure 1:
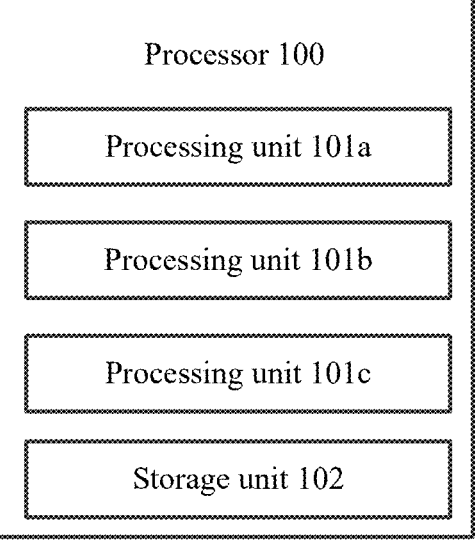
FIG. 1 is a schematic diagram of a processor of a data processing method, according to an embodiment of the present disclosure.

Hereinafter, technical solutions of embodiments of the present disclosure will be described in a clear and comprehensive manner with reference to accompanying drawings of the present disclosure. It is evident that the embodiments described herein are some rather than all embodiments of the present disclosure. Based on embodiments of the present disclosure, other embodiments derived by those of ordinary skill in the art without making creative efforts shall all fall within the protection scope of the present disclosure.

It should be understood that, the terms "include/comprise" and "contain" as well as variations thereof used in the specification and claims of the present disclosure indicate existence of described features, wholes, steps, operations, elements, and/or components, but do not exclude existence or addition of one or more other features, wholes, steps, operations, elements, components, and/or sets.

It should also be understood that, terms used in the specification of the present disclosure are merely for describing a specific embodiment, and not intended to limit the present disclosure. As used in the specification and claims of the present disclosure, unless the context clearly indicates otherwise, the terms "a/an", "a piece of", and "the/this" in a singular form mean to include plural forms. It should be further understood that, the term "and/or" used in the specification and claims of the present disclosure refers to any combination of one or more of items listed in association and all possible combinations, and may include these combinations.

As used in the specification and claims, the term "if" may be interpreted as "when", "once", "in response to a determination", or "in response to a case where something is detected" depending on the context. Similarly, the terms "if it is determined that" or "if [the condition or event described] is detected" may be interpreted as "once it is determined that", or "in response to a determination", or "once [the condition or event described] is detected", or "in response to a case where [the condition or event described] is detected" depending on the context.

A data processing method of embodiments of the present disclosure may be applied to a processor. The processor may be a general-purpose processor, such as a central processing unit (CPU), or an intelligence processing unit (IPU) configured to perform artificial intelligence computations. The artificial intelligence computation may include a machine learning computation, a brain-like computation, and the like. The machine learning computation may include a neural network computation, a k-means computation, a support vector machine computation, and the like. The IPU may include, for example, one or a combination of a graphics processing unit (GPU), a neural-network processing unit (NPU), a digital signal process (DSP), and a field-programmable gate array (FPGA) chip. The present disclosure does not limit the type of the processor.

In a possible implementation, the processor of the present disclosure may include a plurality of processing units, and each of the plurality of processing units may independently run various assigned tasks, such as convolution computation tasks, pooling tasks, or full connection tasks. The present disclosure does not limit the processing unit and a task run by the processing unit.

FIG. 1 is a schematic diagram of a processor of a data processing method according to an embodiment of the present disclosure. As illustrated in FIG. 1, a processor 100 may include a plurality of processing units 101 (e.g., processing units 101a, 101b, and 101c) and a storage unit 102. The plurality of processing units 101 may be configured to execute instruction sequences. The storage unit 102 may be configured to store data. The storage unit 102 may include a random-access memory (RAM) and a register file. The plurality of processing units 101 of the processor 100 may not only share part of a storage space (for example, the plurality of processing unit 101 may share part of a RAM storage space and a register file), but may also have their own storage space.

FIG. 2 is a flowchart of a data processing method according to an embodiment of the present disclosure. As illustrated in FIG. 2, the method may include:

In step S11, determining a transfer mode of a data transfer instruction when a decoded processing instruction is the data transfer instruction;

In step S12, determining the first source data addresses and the first destination data addresses of a plurality of first data points as well as second source data addresses and second destination data addresses of a plurality of second data points in an operation domain of the data transfer instruction when the transfer mode of the data transfer instruction is a multi-vector transfer mode;

In step S13, storing the first data points read from the first source data addresses to the first destination data addresses to obtain first vector data; and In step S14, storing the second data points read from the second source data addresses to the second destination data addresses to obtain second vector data, where the first source data addresses and the second source data addresses may include a plurality of discrete data addresses, and the first destination data addresses and the second destination data addresses may include consecutive data addresses.

According to embodiments of the present disclosure, a plurality of pieces of vector data may be obtained by respectively transferring discrete data to a plurality of consecutive data addresses via one data transfer instruction. As such, vector computation and other processing may be implemented, which may simplify a processing process, thereby reducing data overhead.

In a possible implementation, the method may further include decoding a received processing instruction to obtain the decoded processing instruction. The decoded processing instruction may include an operation code, and the operation code is configured to indicate a performing of data transfer processing.

For example, when receiving the processing instruction, the processor may decode the received processing instruction to obtain the decoded processing instruction. The decoded processing instruction may include an operation code and an operation domain. The operation code is configured to indicate a processing type of the processing instruction, and the operation domain is configured to indicate data to be processed and data parameters of the data to be processed. If the operation code of the decoded processing instruction indicates a performing of data transfer processing, the instruction is a data transfer instruction (such as gather load).

In a possible implementation, the transfer mode (for example, the transfer mode may be expressed as "gather load offset mode") of the data transfer instruction may be determined in step S11 if the decoded processing instruction is the data transfer instruction.

In a possible implementation, the transfer mode of the data transfer instruction that may be set in advance may include a single vector transfer mode (such as expressed as "Mode0"), a multi-vector transfer mode (such as expressed as "Model"), and the like. In the single vector transfer mode, a data transfer instruction may be used to aggregate a plurality of discrete data points into one piece of vector data. In the multi-vector transfer mode, a data transfer instruction may be used to aggregate a plurality of discrete data points into two or more pieces of vector data. The transfer mode may be determined according to a field configured to indicate the transfer mode in an operation domain of the data transfer instruction, such as a field "Mode0" or a field "Model", which is not limited in the present disclosure.

When pairs or sets of discrete points are required to be transferred to perform a computation (such as a difference computation), since adjacent points are generally in a same cache space (such as a cache line), a multi-vector transfer mode may be adopted, so that two or more data points may be obtained by fetching data points once. Finally, two or more different vectors may be generated, which is conducive to performing vector computation to obtain a final result (such as a difference vector).

In a possible implementation, if the transfer mode of the data transfer instruction is a multi-vector transfer mode, in step S12, destination data addresses and source data addresses of to be transferred data points may be determined. The source data addresses represent present data storage addresses of a plurality of data points in a data storage space, which are a plurality of discrete data addresses. The destination data addresses represent data addresses of a data storage space to which a plurality of data points are to be transferred, which are consecutive data addresses. The data storage space corresponding to the source data addresses and the data storage space corresponding to the destination data addresses may be the same or different, which is not limited in the present disclosure.

In a possible implementation, in a multi-vector transfer mode, at least two vectors may be obtained. The first vector may be set as first vector data, and other vectors may be set as second vector data (including at least one piece of vector data). A plurality of first data points corresponding to the first vector data have the first source data addresses and the first destination data addresses, and a plurality of second data points corresponding to the second vector data have second source data addresses and second destination data addresses.

In a possible implementation, after determining the source data addresses and the destination data addresses of the first data points and the source data addresses and the destination data addresses of the second data points, in step S13, the processor may read the plurality of discrete first data points from the first source data addresses respectively, and store the read plurality of first data points into the first destination data addresses to obtain the first vector data of a preset length. In addition, in step S14, the processor may read the plurality of discrete second data points from the second source data addresses respectively, and store the read plurality of second data points into the second destination data addresses to obtain the second vector data of a preset length, thereby completing a multi-vector data transfer.

In a possible implementation, after the multi-vector data transfer is completed, processing may be performed on a plurality of pieces of vector data according to a data computation instruction, such as a four-arithmetic computation on at least two pieces of vector data, or a difference computation between two pieces of vector data.

As such, in an application scenario (such as image recognition) where a large number of pairs of discrete data points need to be computed, a pair of discrete data or a set of discrete data may be transferred into a consecutive address spaces via a data transfer instruction, so as to be aggregated as two or more pieces of vector data for further vector computation. As such, computation of discrete data points is converted into vector computation, which may simplify a processing process, thereby reducing data overhead.

In a possible implementation, the step S12 may include: respectively determining the source data addresses of the plurality of first data points according to source data base addresses and data offset addresses of the plurality of first data points; respectively determining the second source data addresses of the plurality of second data points according to the first source data addresses and an offset stride of the plurality of first data points; determining the first destination data addresses of the plurality of first data points according to destination data base addresses and data sizes of the plurality of first data points; and determining the second destination data addresses of the plurality of second data points according to the first destination data addresses and destination base address strides of the plurality of first data points.

Figure 5:
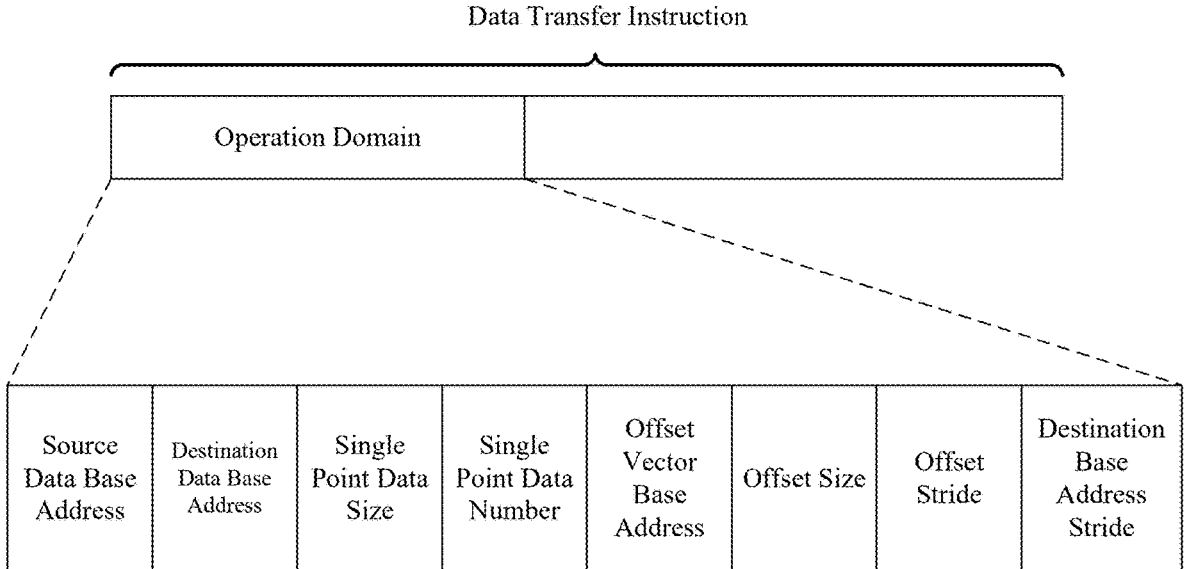
FIG. 5 is a diagram of an example data transfer instruction, according to an embodiment of the present disclosure.

For example as shown in FIG. 5, the operation domain of the data transfer instruction may include a source data base address, a destination data base address, a single point data size, a single point data number, an offset vector base address, an offset size, an offset stride, a destination base address stride, and the like.

The source data base address may represent a present base address of a plurality of discrete data points in a data storage space, and the destination data base address may represent a base address in a data storage space to which the plurality of data points to be transferred. The single point data size may represent the data size of each discrete data point (such as 4 bits or 8 bits). The single point data number may represent the number N (N is an integer greater than 1) of discrete data points. The data offset base address of a single data point may represent a base address of the discrete data point offset relative to the source data base address. The offset size may represent the width of an offset address corresponding to each discrete data point, which is for example equal to the size of a single data point. The offset stride may represent an offset of a source data address of a second data point relative to a source data address of a first data point. The destination base address stride may represent an offset of a destination data base address of a second data point relative to a destination data base address of a first data point. The two parameters, the offset stride and the destination base address stride, may only be valid in the multi-vector transfer mode. The specific count and types of parameters in the operation domain of the data transfer instruction are not limited in the present disclosure.

In a possible implementation, a data offset address of each first data point may be determined according to a data offset base address and an offset size of each first data point. For example, for the n-th first data point $(1 < n < N)$, a data offset base address of the first data point is 24, and an offset size of the first data point is 4, then a data offset address of the first data point, Offset Address [n], is [24, 27]. As such, a first source data address of the n-th first data point may be determined according to a source data base address and the data offset address. On condition that two vectors are obtained by transferring, the first source data address may be expressed as:

$$\text{Single Point } Src \text{ Addr}[2n] = \text{Source Data Base Address} + \text{Offset Address}[n] \quad (1).$$

In formula (1), Single Point Src Addr [2n] represents the first source data address of the n-th first data point. When the source data base address is, for example, Addr1 [15], and the data offset address is [24, 27], the first source data address of the n-th first data point may be determined to be Addr1 [39, 42].

In this way, for each first data point, a source data address may be determined, so that the first data point may be read from the source data address.

In a possible implementation, in step S12, the second source data addresses of the plurality of second data points may be determined according to the first source data addresses and the offset strides of the plurality of first data points.

For example, the operation domain of the data transfer instruction may include a source data base address, an offset vector base address of a single data point, an offset size of a single data point, and an offset stride of a single data point, and the like. In the multi-vector transfer mode, a corresponding second source data address of a second data point may be obtained directly based on a first source data address of a first data point according to the offset stride.

$$\text{Single Point } Src \text{ Addr}[2n+1]=\text{Source Data Base} \\ \text{Address+Offset Address}[n]+\text{Offset Stride} \qquad (2)$$

In formula (2), Single Point Src Addr $[2n+1]$ represents the second source data address of the second data point corresponding to the n-th first data point. For example, when the first source data address of the n-th first data point is determined to be Addr1 [39, 42] according to the source data base address and the data offset address, and the offset stride is 8 bits, the second source data address of the n-th second data point may be determined to be Addr1 [47, 50].

In a possible implementation, when a plurality of sets of second data points need to be read to form a plurality of second vectors, the offset stride may have a plurality of values, such as 4 bits, 8 bits, 12 bits, and the like. In this way, second source data addresses of each set of second data points may be determined respectively according to different offset strides. Those skilled in the art may set the count and value of the offset stride according to an actual situation, which is not limited in the present disclosure.

In this way, the corresponding source data address of the second data point may be determined directly according to the source data address of the first data point and the offset stride of the first data point, so that two or more data points may be obtained by reading once, which allows instruction to read a relatively large amount of data according to a relatively small number of addresses (for example, 100 data points may be read via data offset base addresses of 50 data points), thereby significantly reducing data overhead.

In a possible implementation, in step S12, the first destination data addresses of the plurality of first data points may be determined according to the destination data base address and the data size of the plurality of first data points.

For example, the operation domain of the data transfer instruction may include a destination data base address, a single point data size, and the like. Since the destination data addresses are consecutive data addresses, the destination data addresses of each first data points may be determined directly according to the data sizes and the serial numbers of the first data points sequentially. On condition that two vectors are obtained by transferring, the first destination data address may be expressed as:

$$\text{Single Point Dest Addr }[2n]=\text{Destination Data Base} \\ \text{Address+}n*\text{Single Point Data Size} \qquad (3).$$

In formula (3), Single Point Dest Addr [2n] represents the first destination data address of the n-th first data point. When the destination data base address is, for example, Addr2 [0, 3], and the size of a single data point is 4 bits, and n is equal to 3, the first destination data address of the third first data point may be determined to be Addr2 [12, 15].

In this way, for each first data point, a first destination data address may be determined, so that each first data point read from the first source data address may be transferred to the first destination data address of the first data point.

In a possible implementation, in step S12, the second destination data addresses of the plurality of second data points may be determined according to the first destination data addresses and the destination base address stride of the plurality of first data points.

For example, the operation domain of the data transfer instruction may include a destination data base address, a single point data size, a destination base address stride, and the like. In the multi-vector transfer mode, a corresponding second destination data address of a second data point may be obtained directly based on a first destination data address of a first data point according to the destination base address stride.

On condition that two vectors are obtained by transferring, the second destination data address may be expressed as:

$$\text{Single Point Dest Addr}[2n+1]=\text{Destination Data} \\ \text{Base Address+}n*\text{Single Point Data Size+Desti-} \\ \text{nation Base Address Stride} \qquad (4).$$

In formula (4), Single Point Dest Addr [2n+1] represents the second destination data address of the second data point corresponding to the n-th first data point. For example, when the first destination data address of the n-th first data point is determined to be Addr2 [9, 12] according to the destination data base address and the data size, and the destination base address stride is 48 bits, the second destination data address of the n-th second data point may be determined to be Addr2 [57, 60].

In a possible implementation, when a plurality of sets of second data points need to be read to form a plurality of second vectors, the destination base address stride may have a plurality of values. For example, the destination base address stride may include 48 bits, 96 bits, and the like, so as to store a plurality of pieces of vector data separately. In this way, second destination data addresses of each set of second data points may be determined respectively according to different destination base address strides. Those skilled in the art may set the count and value of the destination base address stride according to an actual situation, which is not limited in the present disclosure.

In this way, the destination data address of the corresponding second data point may be determined directly according to the destination data address of the first data point and the destination base address stride of the first data point, so that data points of two or more pieces of vector data may be stored, thereby significantly reducing data overhead.

In a possible implementation, step S13 may include: reading the first data points from the first source data addresses of the first data points respectively; and storing the first data points into the first destination data addresses sequentially to obtain the first vector data.

For example, after determining the first source data addresses and the first destination data addresses of the first data points in the operation domain, the first data points may be read from the first source data addresses of the first data points and stored in the first destination data addresses sequentially. For example, when n is equal to 3, data is read from the first source data address Addr1 [39, 42] of the third first data point and stored in the first destination data address Addr2 [9, 12], thereby completing data transfer of the first data point. In this way, the first data points are sequentially transferred to obtain N consecutive first data points stored in the first destination data addresses, thereby aggregating the discrete first data points into the first vector data.

In this way, data transfer may be realized to provide a data basis for subsequent processing.

In a possible implementation, step S14 may include: reading the second data points from the second source data addresses of the second data points respectively; and storing the second data points into the second destination data addresses sequentially to obtain the second vector data.

For example, similarly, the second data points may be read from the second source data addresses of the second data points respectively and stored in the second destination data addresses sequentially. For example, when n is equal to 3, data is read from the second source data address Addr1 [47, 50] of the third second data point and stored in the second destination data address Addr2 [57, 60], thereby completing data transfer of the second data point. In this way, the second data points are sequentially transferred to obtain N consecutive second data points stored in the second destination data addresses, thereby aggregating discrete second data points into second vector data.

In this way, data transfer may be realized to provide a data basis for subsequent processing.

According to the data processing method of embodiments of the present disclosure, pairs or sets of discrete data may be transferred to a plurality of consecutive address spaces through a data transfer instruction of a multi-vector transfer mode and to be aggregated into a plurality of pieces of vector data respectively. As such, in an application scenario (such as image recognition), where a large number of pairs (or sets) of discrete data points need to be computed, a plurality of pieces of vector data involved in computation may be obtained directly via an instruction, and computation of discrete data points may be converted into vector computation, which may simplify a processing process, thereby reducing data overhead.

It should be noted that, for the sake of simplicity, the foregoing method embodiments are described as a combination of a series of actions. However, those skilled in the art should know that the present disclosure is not limited by the sequence of described actions. That is because that, according to the present disclosure, certain steps may be performed in other orders or simultaneously. Besides, those skilled in the art should know that the embodiments described in the specification are optional embodiments and the actions and units involved are not necessarily essential to the present disclosure.

It should be further noted that, although steps in the flowchart are displayed sequentially according to the arrows, these steps are not necessarily executed in the sequence indicated by the arrows. Unless explicitly stated herein, the execution of these steps is not strictly limited to the order, and these steps may be executed in other orders. Moreover, at least a part of the steps in the flowchart may include a plurality of sub-steps or stages. These sub-steps or stages are not necessarily executed simultaneously, but may be executed at different times. These sub-steps or stages are not necessarily executed sequentially, but may be executed in turns or alternately with other steps or sub-steps of other steps or at least a part of the stages.

Figure 3:
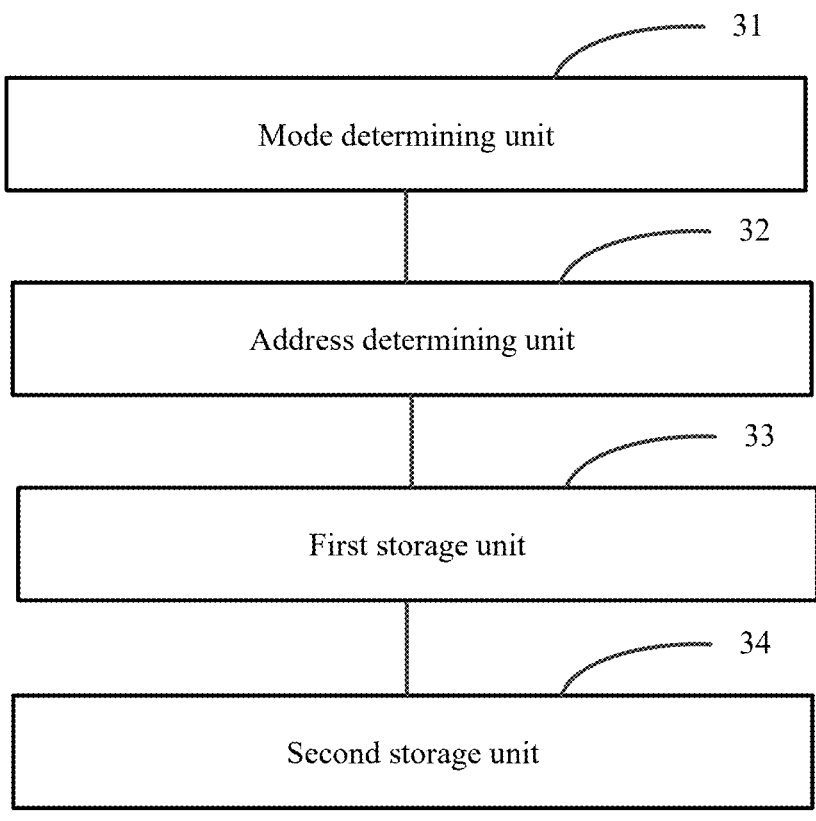
FIG. 3 is a block diagram of a data processing apparatus, according to an embodiment of the present disclosure.

FIG. 3 is a block diagram of a data processing apparatus according to an embodiment of the present disclosure. As illustrated in FIG. 3, the data processing apparatus may include a mode determining unit 31, an address determining unit 32, a first storage unit 33, and a second storage unit 34. The mode determining unit 31 may be configured to determine a transfer mode of a data transfer instruction when a decoded processing instruction is the data transfer instruction. The address determining unit 32 may be configured to determine the first source data addresses and the first destination data addresses of a plurality of first data points as well as second source data addresses and second destination data addresses of a plurality of second data points in an operation domain of the data transfer instruction when the transfer mode of the data transfer instruction is a multi-vector transfer mode. The first storage unit 33 may be configured to obtain the first vector data by storing the first data points read from the first source data addresses to the first destination data addresses. The second storage unit 34 may be configured to obtain second vector data by storing the second data points read from the second source data addresses to the second destination data addresses. The first source data addresses and the second source data addresses may include a plurality of discrete data addresses, and the first destination data addresses and the second destination data addresses may include consecutive data addresses.

In a possible embodiment, the address determining unit may include a first source address determining subunit, a second source address determining subunit, a first destination address determining subunit, and a second destination address determining subunit. The first source address determining subunit may be configured to determine the first source data addresses of the plurality of first data points respectively according to a source data base address and data offset addresses of the plurality of first data points. The second source address determining subunit may be configured to determine the second source data addresses of the plurality of second data points respectively according to the first source data addresses and an offset stride of the plurality of first data points. The first destination address determining subunit may be configured to determine the first destination data addresses of the plurality of first data points according to a destination data base address and a data size of the plurality of first data points. The second destination address determining subunit may be configured to determine the second destination data addresses of the plurality of second data points according to the first destination data addresses and destination base address strides of the plurality of first data points.

In a possible implementation, the first storage unit may include a first reading subunit and a first storage subunit. The first reading subunit may be configured to read the first data points from the first source data addresses of the first data points respectively. The first storage subunit may be configured to obtain the first vector data by storing the first data points into the first destination data addresses sequentially.

In a possible implementation, the second storage unit may include a second reading subunit and a second storage subunit. The second reading subunit may be configured to read the second data points from the second source data addresses of the second data points respectively. The second storage subunit may be configured to obtain the second vector data by storing the second data points into the second destination data addresses sequentially.

In a possible implementation, the apparatus may further include a decoding unit. The decoding unit may be configured to obtain the decoded processing instruction by decoding a received processing instruction, where the decoded processing instruction may include an operation code, and the operation code is configured to indicate a performing of data transfer processing.

It should be understood that, the foregoing apparatus embodiments are merely illustrative, and the apparatus of the present disclosure may be implemented in other manners. For example, the division of the unit/module in the foregoing embodiments is only a logical function division and there may be other manners of division in actual implementations. For instance, a plurality of units, modules, or components may be combined or may be integrated into another system, or some features may be ignored, omitted, or not performed.

In addition, unless indicated otherwise, functional units/modules in various embodiments of the present disclosure may be integrated into one unit/module, or each unit/module may be physically present alone, or two or more units/modules may be integrated into one unit/module. The above-mentioned integrated unit/module may be implemented in the form of hardware or a software program unit.

If the integrated unit/module is implemented in the form of hardware, the hardware may be a digital circuit, an analog circuit, and the like. The physical realization of a hardware structure may include, but is not limited to, a transistor, a memristor, and the like. Unless specified otherwise, an intelligence processing unit may be any appropriate hardware processor, such as CPU, GPU, FPGA, DSP, and ASIC (application specific integrated circuit). Unless specified otherwise, a storage unit may be any suitable magnetic storage medium or magneto-optical storage medium, such as a resistive random access memory (RRAM), a dynamic random access memory (DRAM), a static random access memory (SRAM), an enhanced dynamic random access memory (EDRAM), a high-bandwidth memory (HBM), and a hybrid memory cube (HMC), and the like.

The integrated unit/module may be stored in a computer readable memory when it is implemented in the form of a software program unit and is sold or used as a separate product. Based on such understanding, the technical solutions of the present disclosure essentially, or the part of the technical solutions that contributes to the related art, or all or part of the technical solutions, may be embodied in the form of a software product. The software product is stored in a memory and may include instructions for making a computer device (which may be a personal computer, a server, or a network device, and the like.) to perform all or part of the operations of the method described in the various embodiments of the present disclosure. The memory may include various medium capable of storing program codes, such as a universal serial bus (USB) flash driver, a read-only memory (ROM), a RAM (random access memory), a removable hard driver, disk, and optical disc, and the like.

In a possible implementation, an artificial intelligence chip is further provided. The artificial intelligence chip may include the above data processing apparatus.

In a possible implementation, an electronic device is further provided. The electronic device may include the above artificial intelligence chip.

In a possible implementation, a board card is further provided. The board card may include a storage component, an interface apparatus, a control component, and the above artificial intelligence chip. The artificial intelligence chip is respectively connected with the storage component, the control component, and the interface apparatus. The storage component is configured to store data. The interface apparatus is configured to implement data transmission between the artificial intelligence chip and an external device. The control component is configured to monitor a state of the artificial intelligence chip.

Figure 4:
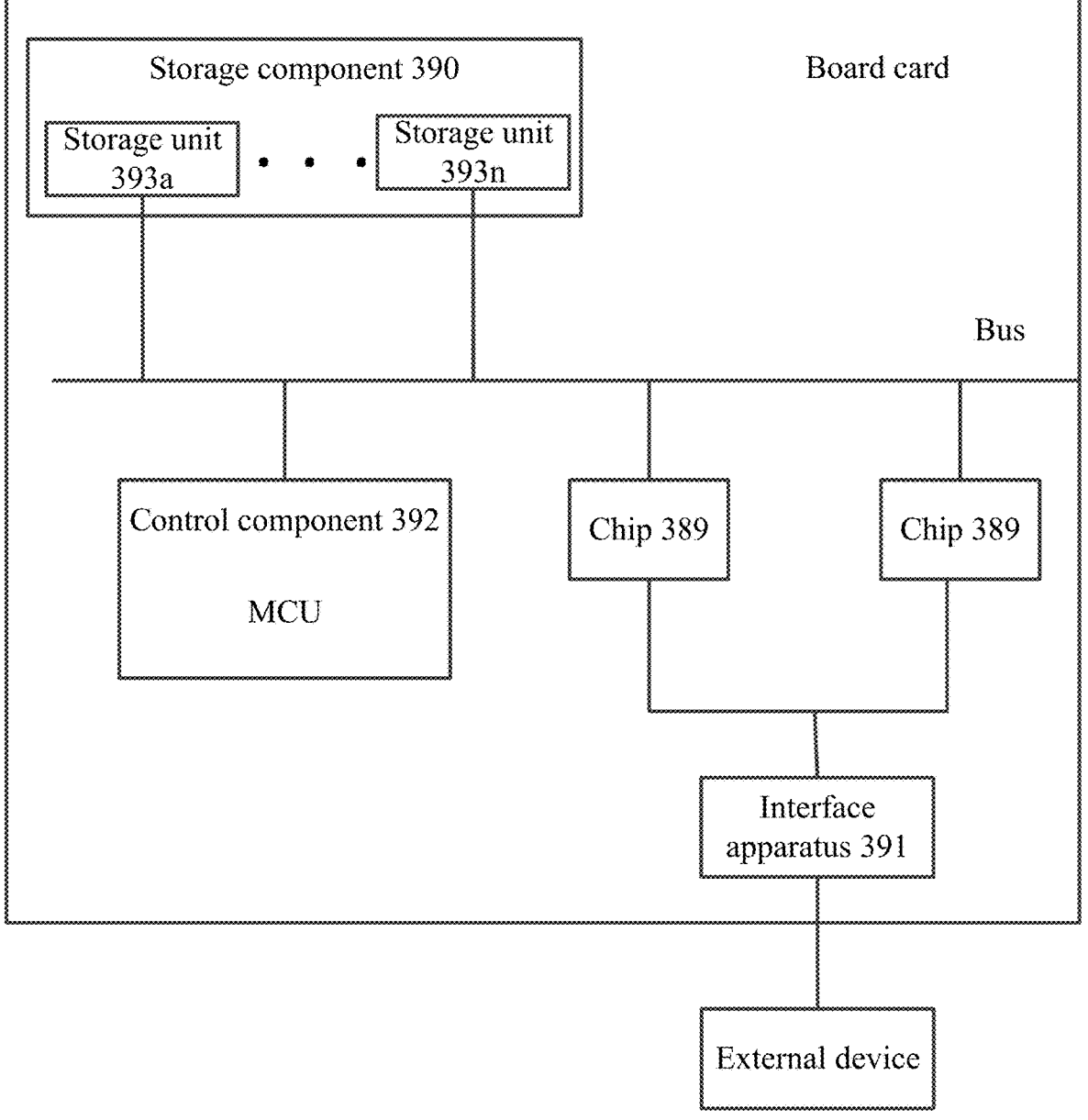
FIG. 4 is a structural block diagram of a board card, according to an embodiment of the present disclosure.

FIG. 4 is a structural block diagram of a board card according to an embodiment of the present disclosure. Referring to FIG. 4, the board card may include other supporting components in addition to the chip 389 described above. The supporting components may include, but is not limited to, a storage component 390 that includes storage units 393a . . . 393n, an interface apparatus 391, and a control component 392.

The storage component 390 is connected with the artificial intelligence chip via a bus, and is configured to store data. The storage component may include a plurality of sets of storage unit 393. Each set of storage units are connected with the artificial intelligence chip via the bus. It may be understood that, each set of storage units may be a double data rate (DDR) synchronous dynamic random-access memory (SDRAM).

DDR may double a speed of an SDRAM without increasing a clock rate. DDR allows data to be read on rising and falling edges of a clock pulse. A speed of DDR is twice that of a standard SDRAM. In an embodiment, the storage apparatus may include four sets of storage units. Each set of storage units may include a plurality of DDR4 particles (chips). In an embodiment, the artificial intelligence chip may include four 72-bit DDR4 controllers. For a 72-bit DDR4 controller, 64 bits are used for data transmission and 8 bits are used for ECC (error checking and correcting) parity. It may be understood that, if a DDR4-3200 particle is used in each set of storage units, a theoretical bandwidth of data transmission may reach 25600 MB/s.

In an embodiment, each set of storage units may include a plurality of DDR SDRAMs arranged in parallel. DDR allows data to be transmitted twice in a clock cycle. A controller configured to control the DDR is provided in the chip, which is used to control data transmission and data storage of each storage unit.

The interface apparatus is electrically coupled with the artificial intelligence chip. The interface apparatus may be configured to implement data transmission between the artificial intelligence chip and an external device (such as a server or a computer). For example, in an embodiment, the interface apparatus may be a standard PCIe (Peripheral Component Interface Express) interface. As an example, data to be processed is transmitted from a server to the chip through a standard PCIe interface to realize data transmission. In some embodiments, if a PCIe 3.0×16 interface is used for transmission, a theoretical bandwidth may reach 16000 MB/s. In another embodiment, the interface apparatus may also be other interfaces, and the present disclosure does not limit specific manifestations of the above mentioned other interfaces, as long as an interface unit may realize a transfer function. In addition, a calculation result of the artificial intelligence chip is still transmitted back to an external device (such as a server) through the interface apparatus.

The control component is electrically coupled with the artificial intelligence chip. The control component is configured to monitor a state of the artificial intelligence chip. As an example, the artificial intelligence chip is electrically coupled with the control component through an SPI (Serial Peripheral Interface). The control component may include a micro controller unit (MCU). For example, the artificial intelligence chip may include a plurality of processing chips, a plurality of processing cores, or a plurality of processing circuits, and may drive a plurality of loads. Therefore, the artificial intelligence chip may be in different working states such as a multi-load working state and a light-load working state. The control component may realize regulation and control of working states of a plurality of processing chips, a plurality of processing, and/or a plurality of processing circuits in the artificial intelligence chip.

In a possible implementation, an electronic device is disclosed. The electronic device may include the above artificial intelligence chip. The electronic device may include a data processing apparatus, a robot, a computer, a printer, a scanner, a tablet, a smart terminal, a mobile phone, a traffic recorder, a navigator, a sensor, a webcam, a server, a cloud server, a camera, a video camera, a projector, a watch, a headphone, a mobile storage, a wearable device, a vehicle, a household appliance, and/or a medical equipment. The vehicle may include an airplane, a ship, and/or a car. The household appliance may include a television, an air conditioner, a microwave oven, a refrigerator, an electric rice cooker, a humidifier, a washing machine, an electric lamp, a gas cooker, and a range hood. The medical equipment may include a nuclear magnetic resonance spectrometer, a B-ultrasonic scanner, and/or an electrocardiograph.

In the foregoing embodiments, the description of each embodiment has its own emphasis. For the part that is not described in detail in an embodiment, reference may be made to related descriptions in other embodiments. The technical features of the foregoing embodiments may be combined arbitrarily. For the sake of concise description, not all possible combinations of the various technical features in the foregoing embodiments are described. However, as long as there is no contradiction in a combination of these technical features, this combination should be considered as falling within the scope of the specification.

The foregoing may be better understood according to the following articles.

Article A1. A data processing method, comprising: determining a transfer mode of a data transfer instruction when a decoded processing instruction is the data transfer instruction; determining first source data addresses and first destination data addresses of a plurality of first data points as well as second source data addresses and second destination data addresses of a plurality of second data points in an operation domain of the data transfer instruction, when the transfer mode of the data transfer instruction is a multi-vector transfer mode; obtaining first vector data by storing the first data points read from the first source data addresses to the first destination data addresses; and obtaining second vector data by storing the second data points read from the second source data addresses to the second destination data addresses, wherein the first source data addresses and the second source data addresses comprise a plurality of discrete data addresses, and the first destination data addresses and the second destination data addresses comprise consecutive data addresses.

Article A2. The method of A1, wherein determining the first source data addresses and the first destination data addresses of the plurality of first data points as well as the second source data addresses and the second destination data addresses of the plurality of second data points in the operation domain of the data transfer instruction, when the transfer mode of the data transfer instruction is the multi-vector transfer mode includes: determining the first source data addresses of the plurality of first data points respectively according to source data base addresses and data offset addresses of the plurality of first data points; determining the second source data addresses of the plurality of second data points respectively according to the first source data addresses and offset strides of the plurality of first data points; determining the first destination data addresses of the plurality of first data points according to destination data base addresses and a data size of the plurality of first data points; and determining the second destination data addresses of the plurality of second data points according to the first destination data addresses and destination base address strides of the plurality of first data points.

Article A3. The method of A1 or A2, wherein obtaining the first vector data by storing the first data points read from the first source data addresses to the first destination data addresses includes: reading the first data points from the first source data addresses of the first data points respectively; and obtaining the first vector data by storing the first data points into the first destination data addresses sequentially.

Article A4. The method of any one of A1 to A3, wherein obtaining the second vector data by storing the second data points read from the second source data addresses to the second destination data addresses includes: reading the second data points from the second source data addresses of the second data points respectively; and obtaining the second vector data by storing the second data points into the second destination data addresses sequentially.

Article A5. The method of any one of A1 to A4, further comprising: obtaining the decoded processing instruction by decoding a received processing instruction, wherein the decoded processing instruction includes an operation code, and the operation code is configured to indicate a performing of a data transfer processing.

Article A6. A data processing apparatus, comprising: a mode determining unit configured to determine a transfer mode of a data transfer instruction when a decoded processing instruction is the data transfer instruction; an address determining unit configured to determine first source data addresses and first destination data addresses of a plurality of first data points as well as second source data addresses and second destination data addresses of a plurality of second data points in an operation domain of the data transfer instruction, when the transfer mode of the data transfer instruction is a multi-vector transfer mode; a first storage unit configured to obtain first vector data by storing the first data points read from the first source data addresses to the first destination data addresses; and a second storage unit configured to obtain second vector data by storing the second data points read from the second source data addresses to the second destination data addresses, wherein the first source data addresses and the second source data addresses comprise a plurality of discrete data addresses, and the first destination data addresses and the second destination data addresses comprise consecutive data addresses.

Article A7. The device of A6, wherein the address determining unit includes: a first source address determining subunit configured to determine the first source data addresses of the plurality of first data points respectively according to source data base addresses and data offset addresses of the plurality of first data points; a second source address determining subunit configured to determine the second source data addresses of the plurality of second data points respectively according to the first source data addresses and offset strides of the plurality of first data points; a first destination address determining subunit configured to determine the first destination data addresses of the plurality of first data points according to destination data base addresses and data sizes of the plurality of first data points; and a second destination address determining subunit configured to determine the second destination data addresses of the plurality of second data points according to the first destination data addresses and destination base address strides of the plurality of first data points.

Article A8. The device of A6 or A7, wherein the first storage unit includes: a first reading subunit configured to read the first data points from the first source data addresses of the first data points respectively; and a first storage subunit configured to obtain the first vector data by storing the first data points into the first destination data addresses sequentially.

Article A9. The device of any of A6 to A8, wherein the second storage unit includes: a second reading subunit configured to read the second data points from the second source data addresses of the second data points respectively; and a second storage subunit configured to obtain the second vector data by storing the second data points into the second destination data addresses sequentially.

Article A10. The device of any of A6 to A9, further comprising: a decoding unit configured to obtain the decoded processing instruction by decoding a received processing instruction, wherein the decoded processing instruction includes an operation code, and the operation code is configured to indicate a performing of a data transfer processing.

Article A11. An artificial intelligence chip, comprising the data processing apparatus of any one of A6 to A10.

Article A12. An electronic device, comprising the artificial intelligence chip of A11.

Article A13. A board card, comprising a storage component, an interface apparatus, a control component, and the artificial intelligence chip of claim 11, wherein the artificial intelligence chip is coupled with the storage component, the control component, and the interface apparatus; the storage component is configured to store data; the interface apparatus is configured to implement data transmission between the artificial intelligence chip and an external device; and the control component is configured to monitor a state of the artificial intelligence chip The embodiments of the present disclosure have been described in detail above. The principles and implementations of the present disclosure are described in connection with illustrative examples. The descriptions of the foregoing embodiments are merely used to help understand the method and core ideas of the present disclosure. Any changes or modifications based on the implementations and the application scope of the present disclosure made by those skilled in the art, without departing from the spirits of the present disclosure, shall all be encompassed within the protection scope of the present disclosure. Therefore, the content of the specification should not be understood as limitation to the present disclosure.

What is claimed is:

1. A data processing method, comprising:
determining a transfer mode of a data transfer instruction when a decoded processing instruction is the data transfer instruction, wherein the decoded processing instruction includes an operation domain;
determining first source data addresses and first destination data addresses of a plurality of first data points as well as second source data addresses and second destination data addresses of a plurality of second data points in the operation domain of the data transfer instruction, when the transfer mode of the data transfer instruction is a multi-vector transfer mode,
wherein the operation domain of the data transfer instruction includes a source data base address, a destination data base address, a single point data size, a single point data number, an offset vector base address, an offset size, an offset stride, and a destination base address stride, wherein the offset size is a width of an offset address corresponding to each of the plurality of the first data points and is equal to the single point data size, and wherein the offset stride is an offset between a first address of the first source data addresses and a first address of the second source data addresses;
obtaining the second source data addresses by applying the offset stride to the first source data addresses;
obtaining first vector data by storing the first data points read from the first source data addresses to the first destination data addresses; and
obtaining second vector data by storing the second data points read from the second source data addresses to the second destination data addresses, wherein the first source data addresses and the second source data addresses are discrete data addresses, and the first destination data addresses and the second destination data addresses are consecutive data addresses.

2. The method of claim 1, wherein determining the first source data addresses and the first destination data addresses of the plurality of first data points as well as the second source data addresses and the second destination data addresses of the plurality of second data points in the operation domain of the data transfer instruction, when the transfer mode of the data transfer instruction is the multi-vector transfer mode, includes:
determining the first source data addresses of the plurality of first data points respectively according to source data base addresses and data offset addresses of the plurality of first data points;
determining the second source data addresses of the plurality of second data points respectively according to the first source data addresses and offset strides of the plurality of first data points;
determining the first destination data addresses of the plurality of first data points according to destination data base addresses and data sizes of the plurality of first data points; and
determining the second destination data addresses of the plurality of second data points according to the first destination data addresses and destination base address strides of the plurality of first data points.

3. The method of claim 1, wherein obtaining the first vector data by storing the first data points read from the first source data addresses to the first destination data addresses includes:
reading the first data points from the first source data addresses of the first data points respectively; and
obtaining the first vector data by storing the first data points into the first destination data addresses sequentially.

4. The method of claim 1, wherein obtaining the second vector data by storing the second data points read from the second source data addresses to the second destination data addresses includes:
reading the second data points from the second source data addresses of the second data points respectively; and
obtaining the second vector data by storing the second data points into the second destination data addresses sequentially.

5. The method of claim 1, further comprising:
obtaining the decoded processing instruction by decoding a received processing instruction, wherein the decoded processing instruction includes an operation code, and the operation code is configured to indicate a performing of a data transfer processing.

6. A data processing apparatus, comprising:

a mode determining circuit configured to determine a transfer mode of a data transfer instruction when a decoded processing instruction is the data transfer instruction, wherein the decoded processing instruction includes an operation domain;

an address determining circuit configured to determine first source data addresses and first destination data addresses of a plurality of first data points as well as second source data addresses and second destination data addresses of a plurality of second data points in an operation domain of the data transfer instruction, when the transfer mode of the data transfer instruction is a multi-vector transfer mode, wherein the operation domain of the data transfer instruction includes a source data base address, a destination data base address, a single point data size, a single point data number, an offset vector base address, an offset size, an offset stride, and a destination base address stride;

wherein the offset size is a width of an offset address corresponding to each of the plurality of the first data points and is equal to the single point data size, and wherein the offset stride is an offset between a first address of the first source data addresses and a first address of the second source data addresses; and obtain the second source data addresses by applying the offset stride to the first source data addresses;

a first storage circuit configured to obtain first vector data by storing the first data points read from the first source data addresses to the first destination data addresses; and a second storage circuit configured to obtain second vector data by storing the second data points read from the second source data addresses to the second destination data addresses, wherein the first source data addresses and the second source data addresses are discrete data addresses, and the first destination data addresses and the second destination data addresses are consecutive data addresses.

7. The apparatus of claim 6, wherein the address determining circuit includes:

a first source address determining subcircuit configured to determine the first source data addresses of the plurality of first data points respectively according to source data base addresses and data offset addresses of the plurality of first data points;

a second source address determining subcircuit configured to determine the second source data addresses of the plurality of second data points respectively according to the first source data addresses and offset strides of the plurality of first data points;

a first destination address determining subcircuit configured to determine the first destination data addresses of the plurality of first data points according to destination data base addresses and data sizes of the plurality of first data points; and a second destination address determining subcircuit configured to determine the second destination data addresses of the plurality of second data points according to the first destination data addresses and destination base address strides of the plurality of first data points.

8. The apparatus of claim 6, wherein the first storage circuit includes:

a first reading subcircuit configured to read the first data points from the first source data addresses of the first data points respectively; and a first storage subcircuit configured to obtain the first vector data by storing the first data points into the first destination data addresses sequentially.

9. The apparatus of claim 6, wherein the second storage circuit includes:

a second reading subcircuit configured to read the second data points from the second source data addresses of the second data points respectively; and a second storage subcircuit configured to obtain the second vector data by storing the second data points into the second destination data addresses sequentially.

10. The apparatus of claim 6, further comprising:

a decoding circuit configured to obtain the decoded processing instruction by decoding a received processing instruction, wherein the decoded processing instruction includes an operation code, and the operation code is configured to indicate a performing of a data transfer processing.

11. An electronic device that includes a data processing apparatus, the data processing apparatus comprising:

a mode determining circuit configured to determine a transfer mode of a data transfer instruction when a decoded processing instruction is the data transfer instruction, wherein the decoded processing instruction includes an operation domain;

an address determining circuit configured to determine first source data addresses and first destination data addresses of a plurality of first data points as well as second source data addresses and second destination data addresses of a plurality of second data points in an operation domain of the data transfer instruction, when the transfer mode of the data transfer instruction is a multi-vector transfer mode, wherein the operation domain of the data transfer instruction includes a source data base address, a destination data base address, a single point data size, a single point data number, an offset vector base address, an offset size, an offset stride, and a destination base address stride, wherein the offset size is a width of an offset address corresponding to each of the plurality of the first data points and is equal to the single point data size, and wherein the offset stride is an offset between a first address of the first source data addresses and a first address of the second source data addresses; and obtain the second source data addresses by applying the offset stride to the first source data addresses;

a first storage circuit configured to obtain first vector data by storing the first data points read from the first source data addresses to the first destination data addresses; and a second storage circuit configured to obtain second vector data by storing the second data points read from the second source data addresses to the second destination data addresses, wherein the first source data addresses and the second source data addresses are discrete data addresses, and the first destination data addresses and the second destination data addresses are consecutive data addresses.

* * * * *